Patented Oct. 10, 1950

2,525,610

UNITED STATES PATENT OFFICE 2,525,610

METALLIZED DYES FROM TRIMETHYL-ACETOACETONITRILE

Robert S. Long, Plainfield, N. J., assignor to American Cyanamid Company, New York, N. Y., a corporation of Maine No Drawing. Application October 9, 1948, Serial No. 53,755

7 Claims. (Cl. 260—149)

This invention relates to a new class of metallized dyes which are metal complexes of dyestuffs of the general formula

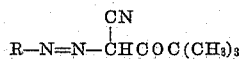

in which R is the radical of a diazotized amine having a metallizable group ortho to the azo linkage.

Aliphatic acetoacetonitriles are difficult to prepare, particularly the low molecular weight compounds of this type. Not only are the compounds difficult to prepare, but many of them are unstable. For example, acetoacetonitrile itself is so unstable that it has not been isolated in the pure state and is only known in the form of derivatives.

Trimethylacetoacetonitrile which is the coupling component used in the preparation of metallizable dyestuffs to be metallized according to the present invention appears to be quite exceptional in its properties. In spite of the fact that most aliphatic acetoacetonitriles are extremely unstable and difficult to prepare, trimethylacetoacetonitrile can be prepared by a fairly simple synthesis and has sufficient stability so that it can be used in a coupling reaction. Once coupled with the diazotized amine having metallizable groups in ortho position azo dyestuffs result which are extremely stable and, particularly, when metallized according to the present invention are capable of producing dyes of excellent fastness and other properties. It is not fully known why the dyestuffs produced from trimethylacetoacetonitrile show such extraordinary stability when the aliphatic acetoacetonitriles, particularly the lower members of this series, are so unstable and therefore the present invention is not intended to be limited to any theory of why compounds belonging to such an unstable group are capable of forming such stable dyestuffs.

It is an advantage of the present invention that the metallized dyestuffs of the present invention can be prepared by the ordinary methods of metallization and dyed by ordinary dyeing procedures to produce strong, fast, and level shades.

The unmetallized dyes used in preparing the metallized dyes of the present invention are themselves new chemical compounds, but they are not claimed as such in the present application, forming instead the subject matter of my copending application Serial No. 53,756, filed October 9, 1948. They are prepared by conventional processes of diazotization and coupling and no particular new techniques need be learned. In general any diazo or tetrazo compound may be used, so long as it contains at least one hydroxyl or carboxyl group ortho to the diazo group. Typical amines which may be diazotized and used in preparing the unmetallized dyes of the present invention are the following: 2-amino-4-nitrophenol, 2-amino-5-nitrophenol, 2-amino-4-chlorophenol, 3-amino-4-hydroxybenzenesulfonic acid, 2-methyl - 4 - amino-5 - hydroxybenzenesulfonic acid, 2-hydroxy-3-amino - 5-nitrobenzenesulfonic acid, 2-hydroxy-3-amino-5-chlorobenzenesulfonic acid, 3-amino-4-hydroxy-5-nitrobenzenesulfonic acid, 2-hydroxy-3-amino-5-sulfobenzoic acid, 2-amino-5-sulfobenzoic acid, anthranilic acid, 1-amino-2-hydroxynaphthalene-4-sulfonic acid, 1-amino-2-hydroxy-6-nitronaphthalene-4-sulfonic acid, and 2-amino-3-hydroxybenzoic acid.

The metallization of the dyestuffs proceeds in the ordinary way by reaction with salts of the common complex forming metals. Chromium is in general the most useful metal for metallization and most of the dyes which are of greatest practical importance are chromium complexes. However, complexes may also be prepared with other metals having an atomic weight 51–64 such as manganese, iron, cobalt, nickel, copper and other metals which are known to metallize azo dyes having metallizable groups. Metallization proceeds more readily at higher temperatures as is common with many metallized dyes and this can be effected by refluxing the dye with aqueous solutions of the salts or other compounds of the metal to be introduced. Among the typical compounds which may be used are the following: chromic hydroxide, chromic acetate, basic chromic acetate, chromic formate, chromic fluoride, chromic chloride, basic chromic chloride, chromic sulfate, chromic benzenesulfonate, and chromic chromate. Corresponding salts of other metals may be employed. The metallizing agents may be used with or without various agents such as acids, bases, buffers, and the like which control the pH. It is also possible to carry out the reaction in the presence of ammonia or amines.

The invention will be described in greater detail in the following examples which are typical illustrations. Parts are by weight.

Example 1

A mixture of 26 parts ethyl trimethylacetate, 10.3 parts acetonitrile, and 10.8 parts of sodium methylate is maintained at a temperature of 102°–105° C. and stirred for four and one-half hours. The reaction mixture is then added to 100 parts ice water, clarified with activated charcoal, and the product precipitated from solution by the careful addition of 20% acetic acid. Trimethylacetoacetonitrile melts at 68° C.

Example 2

A mixture of 5.5 parts of trimethylacetoacetonitrile, 11.5 parts of 5 N sodium hydroxide solution, and 40 parts of water is cooled to 5°–10° and treated with stirring with a solution of 40 parts of water containing 9.5 parts of 5 N sodium hydroxide and 11.2 parts of the diazo compound of 1-amino-2-naphthol-4-sulfonic acid. When coupling is complete, the reaction mixture is diluted with 100 parts of water and strongly acidified with hydrochloric acid. The thick orange precipitate is filtered, giving a quantitative yield of product, of the formula:

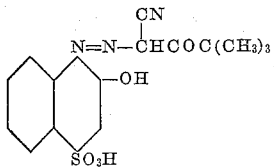

It dyes wool a bright bluish red.

This dyestuff (3.7 parts) is metallized by refluxing in a mixture of 8 parts of water and 22 parts of a basic chromium acetate solution containing 35 g. of chromium per liter; during the metallization there is added 21 parts of water and 12.5 parts of 5 N sulfuric acid. On cooling, there separates a gold-colored precipitate, which is filtered. It dyes wool a brilliant red of bluish shade, with very good leveling and fastness properties.

Example 3

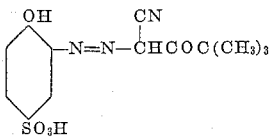

A mixture of 1.9 parts of o-aminophenol-p-sulfonic acid, 6.5 parts of 5 N hydrochloric acid, and 8 parts of water is cooled to 5° C. and diazotized with N sodium nitrite solution. Diazotization is completed by allowing the temperature to rise to 12°. To the diazo mixture is then added a mixture of 1.2 parts of trimethylacetoacetonitrile, 2.4 parts of 5 N sodium hydroxide, and 15 parts of water. Coupling is completed by adding sodium carbonate until the mixture is alkaline to phenolphthalein. The product is isolated by the addition of 24 parts of sodium chloride and acidifying with 5 N hydrochloric acid. The greenish precipitate resulting is filtered and dried. It dyes wool a rust color.

Metallization of the dyestuff thus prepared is effected by refluxing 8.1 parts in 13 parts of water and 22 parts of basic chromium acetate containing 35 g. of chromium per liter, and adding 3.8 parts of 5 N sulfuric acid and 13 parts of water. The metallized dye is salted out by the addition of 20% sodium chloride. It dyes wool a bright level yellow-brown. It also dyes leather yellow-brown to tan shades.

Example 4

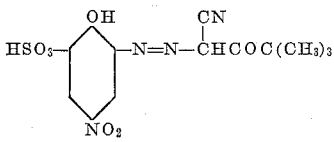

A mixture of 2.4 parts of 2-amino-4-nitrophenol-6-sulfonic acid, 8.6 parts of 5 N hydrochloric acid, and 15 parts of water is diazotized with N sodium nitrite solution. To the resulting solution is added a mixture of 1.4 parts of trimethylacetoacetonitrile, 2.4 parts of 5 N sodium hydroxide solution, and 15 parts of water. The product is isolated by salting out with 10% sodium chloride solution from the still alkaline reaction mixture. The red precipitate is filtered and dried. It dyes wool a greenish-yellow.

Metallization of the above dyestuff is effected according to the procedure of Example 3. The chromated dyestuff dyes wool bright lemon-yellow shades of good light and wash fastness.

Example 5

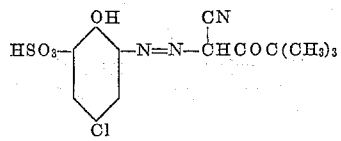

A solution of 2.3 parts of 2-amino-4-chlorophenol-6-sulfonic acid in 4.8 parts of 5 N sodium hydroxide and 30 parts of water, is precipitated by the addition of 17 parts of 5 N hydrochloric acid, and then diazotized with N sodium nitrite. The resulting diazo is added slowly to a solution of 1.4 parts of trimethylacetoacetonitrile in 25 parts of water containing 2.4 parts of 5 N sodium hydroxide and 8.5 parts of sodium carbonate. The dark red precipitate which forms is dissolved in caustic, and reprecipitated as a yellow solid by acidification. It dyes wool a brick-red color.

Metallization is effected by refluxing 3.8 parts of the above dyestuff in 13 parts of water and 22 parts of basic chromium acetate containing 35 g. of chromium per liter, adding during the process 3.8 parts 5 N sulfuric acid and 13 parts of water. With completion of metallization, there separates a good yield of dark greenish precipitate. On wool this gives very level brick-red dyeings of good light and wash fastness.

Example 6

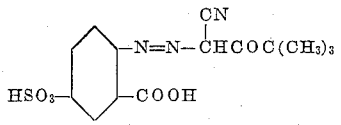

A mixture of 2.75 parts of 5-sulfoanthranilic acid dihydrate, 15 parts of water, and 8.6 parts of 5 N hydrochloric acid is diazotized with N sodium nitrite solution. To the resulting diazo slurry is added a mixture of 1.4 parts of trimethylacetoacetonitrile, 15 parts of water, and 2.4 parts of 5 N sodium hydroxide, keeping the temperature around 10°. When coupling is complete, the product is dissolved in caustic and isolated by the addition of 20% salt solution and 5 N hydrochloric acid. The dyestuff forms a yellow precipitate which is filtered and dried at 60°. It dyes wool a bright greenish-yellow.

Metallization is effected by refluxing 3.5 parts of the above-prepared dyestuff in 13 parts of water and 22 parts of basic chromium acetate solution containing 35 g. of chromium per liter, adding during the process 5.7 g. of 5 N sulfuric acid and 13 parts of water. When metallization is complete, the product is salted out as a green precipitate by the addition of 8 parts of sodium chloride. It is filtered and dried at 60°. It dyes wool greenish-yellow shades of good light fastness.

I claim:
1. A complex of a metal having an atomic weight from 51 to 64 and an azo dye of the formula

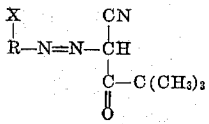

wherein

is the radical of a diazotized amine selected from the group consisting of amines of the benzene series and amines of the naphthalene series and X is a substituent selected from the groups consisting of hydroxyl and carboxyl, the position of said substituent being ortho to the —N=N— group of said formula.

2. A metallized azo dye according to claim 1 in which the metal is chromium.

3. A chromium complex of the dyestuff of the formula

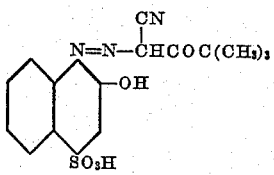

4. A chromium complex of the dyestuff of the formula

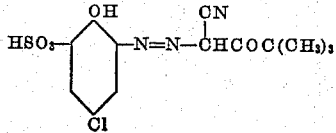

5. A chromium complex of the dyestuff of the formula

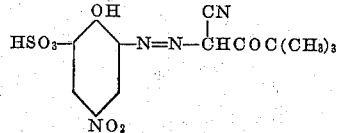

6. A chromium complex of the dyestuff of the formula

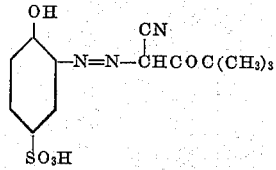

7. A chromium complex of the dyestuff of the formula

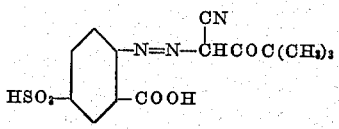

ROBERT S. LONG.

REFERENCES CITED

The following references are of record in the file of this patent:

UNITED STATES PATENTS

| Number | Name | Date |
|---|---|---|
| 2,211,339 | McNally et al. | Aug. 13, 1940 |
| 2,366,633 | Long | Jan. 2, 1945 |
| 2,392,167 | Long | Jan. 1, 1946 |

OTHER REFERENCES

Widman et al.: Ber., v. 44 (1911), pp. 2065–2071, 7 pages.